(12) United States Patent
Fujimoto et al.

(10) Patent No.: US 8,425,438 B2
(45) Date of Patent: Apr. 23, 2013

(54) MOTION ASSIST APPARATUS

(75) Inventors: Hiromichi Fujimoto, Nara (JP); Go Shirogauchi, Kyoto (JP); Keisuke Ueda, Osaka (JP); Motoshi Hori, Osaka (JP); Tatsuro Mizutani, Hyogo (JP)

(73) Assignee: Activelink Co., Ltd., Kyoto (JP)

( * ) Notice: Subject to any disclaimer, the term of this patent is extended or adjusted under 35 U.S.C. 154(b) by 540 days.

(21) Appl. No.: 12/741,426

(22) PCT Filed: Nov. 6, 2008

(86) PCT No.: PCT/JP2008/003212
§ 371 (c)(1),
(2), (4) Date: May 5, 2010

(87) PCT Pub. No.: WO2009/060611
PCT Pub. Date: May 14, 2009

(65) Prior Publication Data
US 2010/0249675 A1  Sep. 30, 2010

(30) Foreign Application Priority Data
Nov. 7, 2007  (JP) .................................. 2007-289813

(51) Int. Cl.
*A61H 1/02* (2006.01)
(52) U.S. Cl.
USPC .................. 601/40; 601/33; 601/148; 482/47
(58) Field of Classification Search .............. 601/5, 23, 601/33, 40, 84, 97, 101, 103, 148–150; 602/20–23; 482/47, 49; 2/161, 163
See application file for complete search history.

(56) References Cited

U.S. PATENT DOCUMENTS
3,707,963 A * 1/1973 Keropian .................... 601/40
4,619,250 A * 10/1986 Hasegawa ................... 601/40
(Continued)

FOREIGN PATENT DOCUMENTS
JP 56-156155 12/1981
JP 2001-276101 10/2001
(Continued)

OTHER PUBLICATIONS

International Preliminary Report on Patentability and Written Opinion of the International Searching Authority, issued Jul. 8, 2010 in PCT/JP2008/003212 (in English).
International Search Report issued Jan. 27, 2009 in International (PCT) Application No. PCT/JP2008/003212.

*Primary Examiner* — Quang D Thanh
(74) *Attorney, Agent, or Firm* — Wenderoth, Lind & Ponack, LLP.

(57) ABSTRACT

A motion assist apparatus is provided with an attaching member that has a glove shape with finger portions and a middle hand portion that is attachable to one of hands of a user, a back-side actuator that is freely expanded and contracted, and bridged between a tip of each of the finger portions and the middle hand portion on the back side of the attaching member, and a palm-side actuator that is freely expanded and contracted, and bridged between the tip of each of the finger portions and the middle hand portion on the palm side of the attaching member, and in this structure, the palm-side actuator is provided with a wire unit formed of two wires that are disposed on each of the finger portions on the palm side from the tip of each of the finger portions on the back side to the middle hand portion along the finger portion, passing through two side portions of the finger portion, so that intervals therebetween are made different at respective positions corresponding to joints of the finger portion, and rubber artificial muscle is coupled to the wire unit and is formed on the middle hand portion.

12 Claims, 14 Drawing Sheets

U.S. PATENT DOCUMENTS

| | | | |
|---|---|---|---|
| 5,103,807 A * | 4/1992 | Makaran | 601/40 |
| 7,601,130 B2 * | 10/2009 | Farrell et al. | 602/20 |
| 2010/0041521 A1 * | 2/2010 | Ingvast et al. | 482/49 |
| 2010/0311546 A1 * | 12/2010 | Kupferman | 482/47 |
| 2012/0059290 A1 * | 3/2012 | Yip | 601/40 |
| 2012/0136284 A1 * | 5/2012 | Land et al. | 601/5 |

FOREIGN PATENT DOCUMENTS

| | | |
|---|---|---|
| JP | 2001-286519 | 10/2001 |
| JP | 2002-345861 | 12/2002 |
| JP | 2006-000294 | 1/2006 |

* cited by examiner

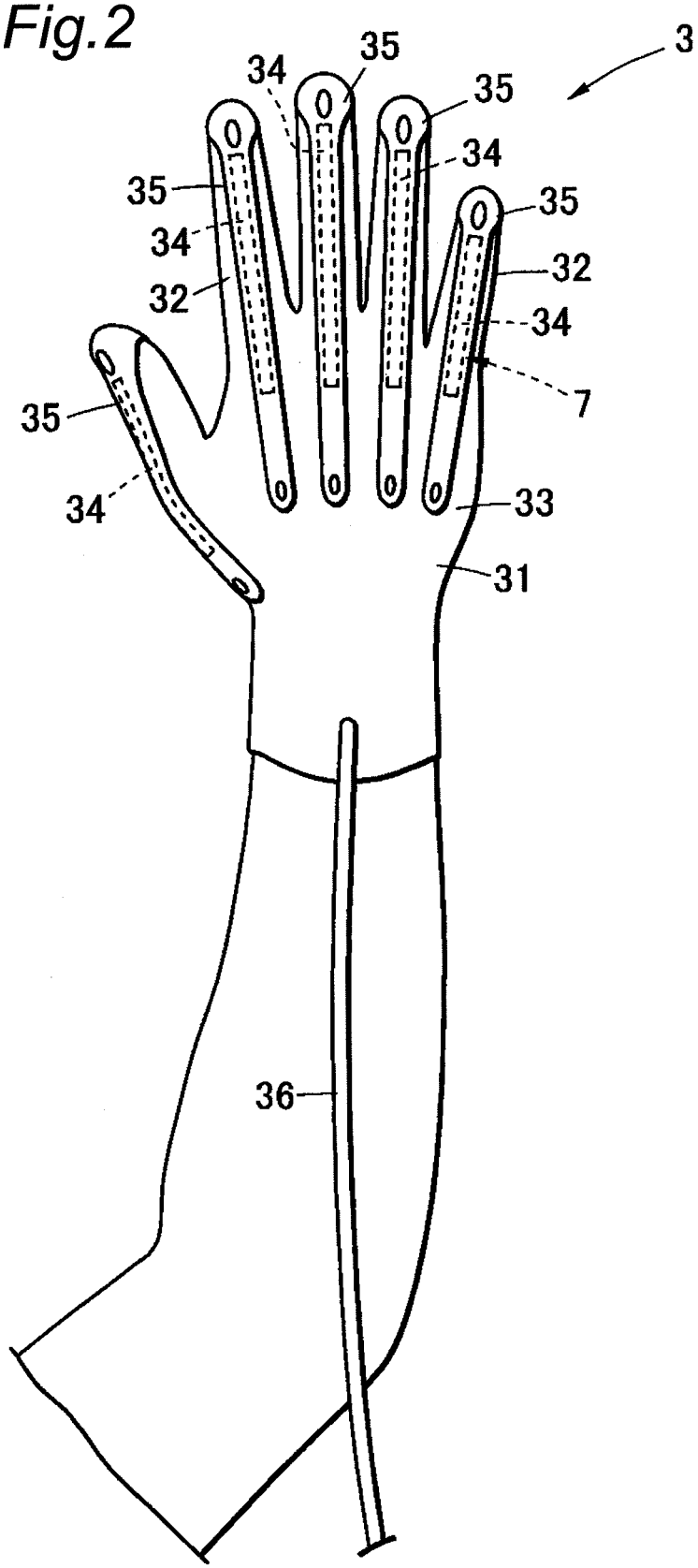

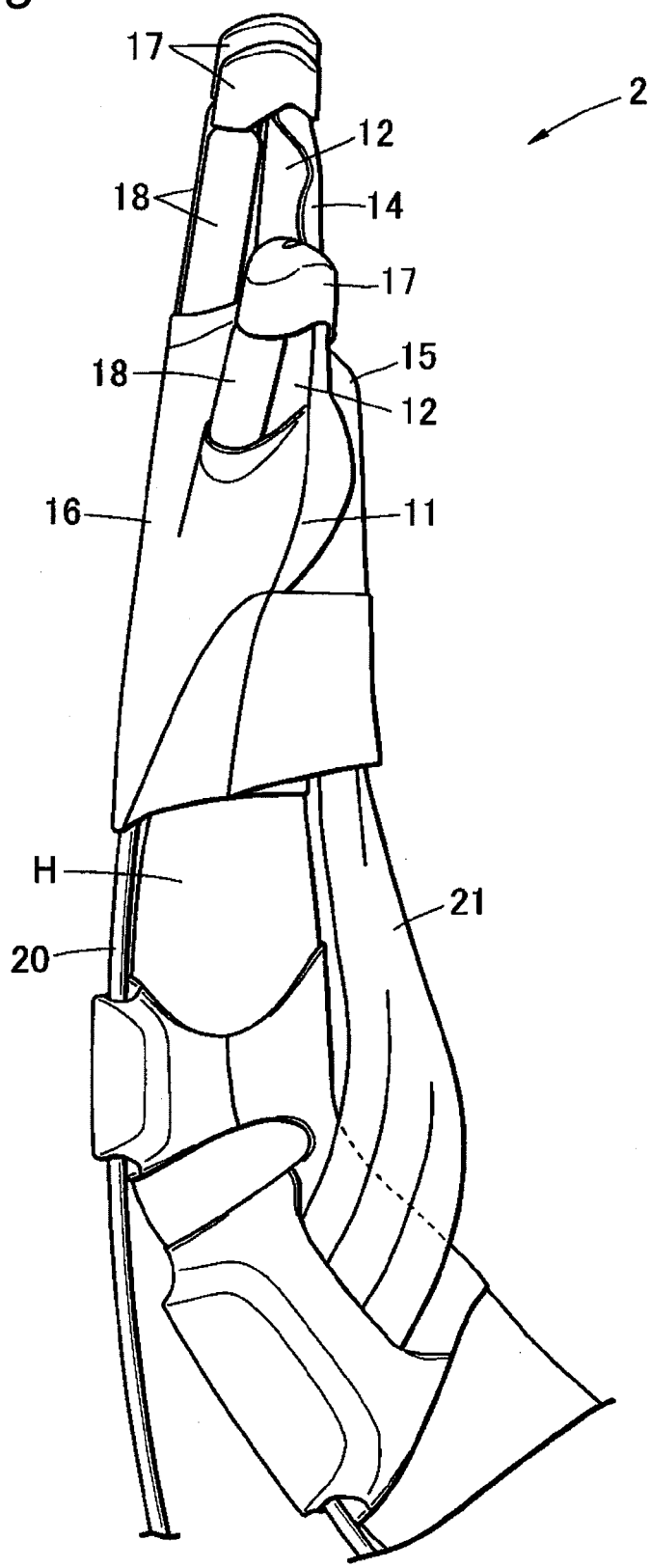

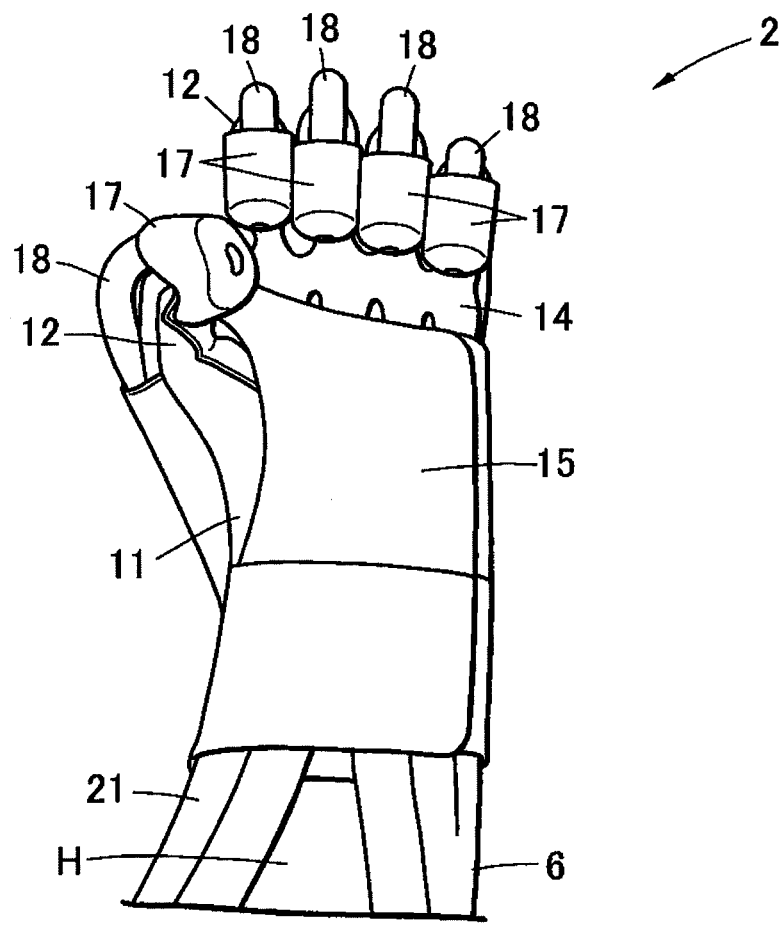

MOTION ASSIST APPARATUS

TECHNICAL FIELD

The present invention relates to a motion assist apparatus that assists motions of fingers and the like of a human body by using an actuator provided with rubber artificial muscles.

BACKGROUND ART

Conventionally, various training apparatuses that are used for patients having a handicap on any of motor functions so as to recover a muscle force of any of portions, such as a hand, a leg, a trunk, or a neck, have been developed. Moreover, in order to assist daily motions of elder people having weakened physical strength or to reduce physical loads of a caregiver, various apparatuses, such as a walking assist apparatus, a lift device for use in going-up and down stairs, or a holding-use lift device, have been developed for a purpose of assisting muscle forces.

In these devices, a technique in which, by allowing a user to put an apparatus on, the user can use the apparatus to assist his or her muscle force, has been proposed, for example, in JP-A No. 2001-286519 (Patent Document 1) or JP-A No. 2001-276101 (Patent Document 2).

The apparatus disclosed in Patent Document 1 is provided with an actuator for applying an assisting force in a bending direction to a joint portion of the user, control means for controlling movements of the actuator, and a pair of attaching units installed on a two sides of the actuator. In accordance with this technique, by operating the actuator, a motion assisting process for bending and extending the joint can be achieved.

The apparatus disclosed in Patent Document 2 is provided with an attaching unit that is flexible, has a cylindrical shape and encloses a joint portion of the user to be tightly made in contact therewith, and an actuator that is integrally formed on a peripheral portion of the attaching unit. In this technique also, by bending the attaching unit by operating the actuator, a motion assisting process for bending and extending a joint can be achieved.

Moreover, JP-A No. 2006-294 (Patent Document 3) has disclosed a power assist apparatus and a power assist glove that are attached to the hands of the user.

This apparatus is provided with a tubular actuator that is curved when a fluid is supplied to a fluid demand unit so that the inner pressure is increased, and an attaching unit used for attaching the actuator to a body in accordance with the joint, and by filling the actuator with a fluid, the actuator is deformed so that the joint is bent or extended.

Patent Document 1: Japanese Unexamined Patent Publication No. 2001-286519
Patent Document 2: Japanese Unexamined Patent Publication No. 2001-276101
Patent Document 3: Japanese Unexamined Patent Publication No. 2006-294

DISCLOSURE OF THE INVENTION

Subjects to be Solved by the Invention

In these conventional techniques, however, upon assisting the bending and extending movements of the joint of the user, the motion assist can be made only in a preliminarily determined direction with a preliminarily determined force, instructed by the control means. For this reason, in the case where the motion assist is carried out in a direction different from a desired direction of the user, or in the case where the motion assist is given with a force different from that desired by the user, for example, with an excessively strong force, the user might be hurt in his or her muscles and joints. In contract, when the force is too weak, an effect for assisting the muscle force might be lowered.

Moreover, the power assist apparatus and the power assist glove disclosed in Patent Document 3 are designed so that, with respect to one joint, the motion is assisted only in one direction. For this reason, an issue arises in that it is not possible to assist mutually different movements, such as bending and extending movements. Moreover, upon bending or extending a joint of a finger by using the power assist glove, since the joint is very small, the joint of the finger might be hurt, for example, when the actuator is operated in a twisted direction.

The present invention has been devised in view of these objects, and an object thereof is to provide a motion assist apparatus which, upon carrying out a motion assist on the user, can assist the motion in a desired direction with a desired force by the user safely.

Means for Solving the Subjects

In order to achieve the above-mentioned objects, the present invention is provided with a motion assist apparatus having the following arrangements.

According to a first aspect of the present invention, there is provided a motion assist apparatus comprising:
an attaching member that has a glove shape with finger portions and a middle hand portion that is attachable to one of hands of a user;
a back-side actuator that is freely expanded and contracted, and bridged between a tip of each of the finger portions and the middle hand portion on the back side of the attaching member; and
a palm-side actuator that is freely expanded and contracted, and bridged between the tip of each of the finger portions and the middle hand portion on the palm side of the attaching member,
wherein the palm-side actuator is provided with a wire unit formed of two wires and a rubber artificial muscle,
the two wires are disposed on each of the finger portions on the palm side from the tip of each of the finger portions on the back side to the middle hand portion along the finger portion, passing through two side portions of the finger portion, so that intervals therebetween are made different at respective positions corresponding to joints of the finger portion, and
the rubber artificial muscle is coupled to the wire unit and is formed on the middle hand portion.

According to a second aspect of the present invention, there is provided the motion assist apparatus according to the first aspect, wherein the wire unit is designed so that the wires have repetitive wide and narrow intervals, so as to provide such intervals as to be narrowed at the positions corresponding to the tip joint of each of the finger portion, and widened at positions corresponding to other joint.

According to a third aspect of the present invention, there is provided the motion assist apparatus according to the first aspect, wherein the finger portions of the attaching member are formed so as to have independent five fingers, with the back-side actuator and the palm-side actuator being disposed in association with each of the finger portions.

According to a fourth aspect of the present invention, there is provided the motion assist apparatus according to the second aspect, wherein the finger portions of the attaching member are formed so as to have independent five fingers, with the back-side actuator and the palm-side actuator being disposed in association with each of the finger portions.

According to a fifth aspect of the present invention, there is provided the motion assist apparatus according to any one of the first to fourth aspects, further comprising:
- a sensor unit that is provided with a bending sensor that is disposed along each of fingers of the other hand of the user with the apparatus being attached thereto, and detects a bending state of the corresponding finger; and
- a control unit for carrying out an operation controlling process on the back-side actuator and the palm-side actuator based upon the bending/extending state of the finger detected by the sensor unit.

According to a sixth aspect of the present invention, there is provided the motion assist apparatus according to the fifth aspect, wherein the control unit carries out an operation controlling process so that the back-side actuator and the palm-side actuator are allowed to execute same extending and bending motions that have been detected by the sensor unit.

According to a seventh aspect of the present invention, there is provided the motion assist apparatus according to the fifth aspect, further comprising:
- an air pressure source for supplying air to the back-side actuator and the palm-side actuator;
- wherein each of the back-side actuator and the palm-side actuator includes a pneumatic rubber artificial muscle, and
- the control unit operates the back-side actuator and the palm-side actuator by controlling an air pressure of the pneumatic rubber artificial muscle.

According to an eighth aspect of the present invention, there is provided the motion assist apparatus according to the sixth aspect, further comprising:
- an air pressure source for supplying air to the back-side actuator and the palm-side actuator;
- wherein each of the back-side actuator and the palm-side actuator includes a pneumatic rubber artificial muscle, and
- the control unit operates the back-side actuator and the palm-side actuator by controlling an air pressure of the pneumatic rubber artificial muscle.

According to a ninth aspect of the present invention, there is provided the motion assist apparatus according to the fifth aspect, further comprising:
- a light emitting device at the tip of each of the finger portions,
- wherein the control unit allows the light emitting device to emit light in cooperation with detection by the sensor unit.

According to a tenth aspect of the present invention, there is provided the motion assist apparatus according to the sixth aspect, further comprising:
- a light emitting device at the tip of each of the finger portions,
- wherein the control unit allows the light emitting device to emit light in cooperation with detection by the sensor unit.

According to an 11th aspect of the present invention, there is provided the motion assist apparatus according to the seventh aspect, further comprising:
- a light emitting device at the tip of each of the finger portions,
- wherein the control unit allows the light emitting device to emit light in cooperation with detection by the sensor unit.

According to a 12th aspect of the present invention, there is provided the motion assist apparatus according to the eighth aspect, further comprising:
- a light emitting device at the tip of each of the finger portions,
- wherein the control unit allows the light emitting device to emit light in cooperation with detection by the sensor unit.

Effects of the Invention

In accordance with the present invention, by allowing the wire unit of the palm-side actuator, attached to each of finger portions of the attaching member, to arrange wires with repetitive wide and narrow portions, so that the wires of the wire unit are placed with a triangular shape for each of spaces between the joints. Therefore, with respect to the wire unit linearly pulled by extension and contraction of the rubber artificial muscle, two portions adjacent to each other on the joint of the finger of the user, can be pulled along an extending direction of the finger, that is, in an extending direction of the wire unit, without causing a deviation from the side in the width direction of the finger portion to the center, or from the center to the side in the width direction thereof. Therefore, without causing an excessive force in an impossible direction to the joint of the finger that is easily damaged even upon application a small external force, the force can be exerted on the finger joint in its original bending direction. Therefore, it becomes possible to prevent the finger joint from being damaged.

Moreover, with the sensor unit having the bending sensor for detecting the bending/extending state of the finger being attached to the normal side, the control unit can carry out operation controls on the back-side actuator and the palm-side actuator, while detecting the bending/extending state of the finger on the normal side, muscles on the paralyzed side are allowed to exert a muscle force consciouslessly. Therefore, it is possible to provide an effective rehabilitation machine for improving a neuron network of fingers on the paralyzed side.

Furthermore, by operation-controlling the rubber artificial muscle used for the back-side actuator and the palm-side actuator by utilizing a pressure applied by the high-pressure air source, the pressing force to be applied to the actuators can be made flexible, thereby making it possible to reduce the load to be applied to the fingers.

BRIEF DESCRIPTION OF THE DRAWINGS

These and other aspects and features of the present invention will become clear from the following description taken in conjunction with the preferred embodiments thereof with reference to the accompanying drawings, in which:

FIG. 2 is an appearance view that shows a structure of a sensor unit of the power assist glove of FIG. 1 in a state where it is put on a right hand;

FIG. 3C is a structural view that shows the actuator unit of FIG. 3A, when viewed from a side;

FIG. 4B is a structural view that shows the actuator unit of FIG. 4A, when viewed from the side;

BEST MODE FOR CARRYING OUT THE INVENTION

Referring to drawings, the following description will discuss a motion assist apparatus in accordance with one embodiment of the present invention.

Figure 1:
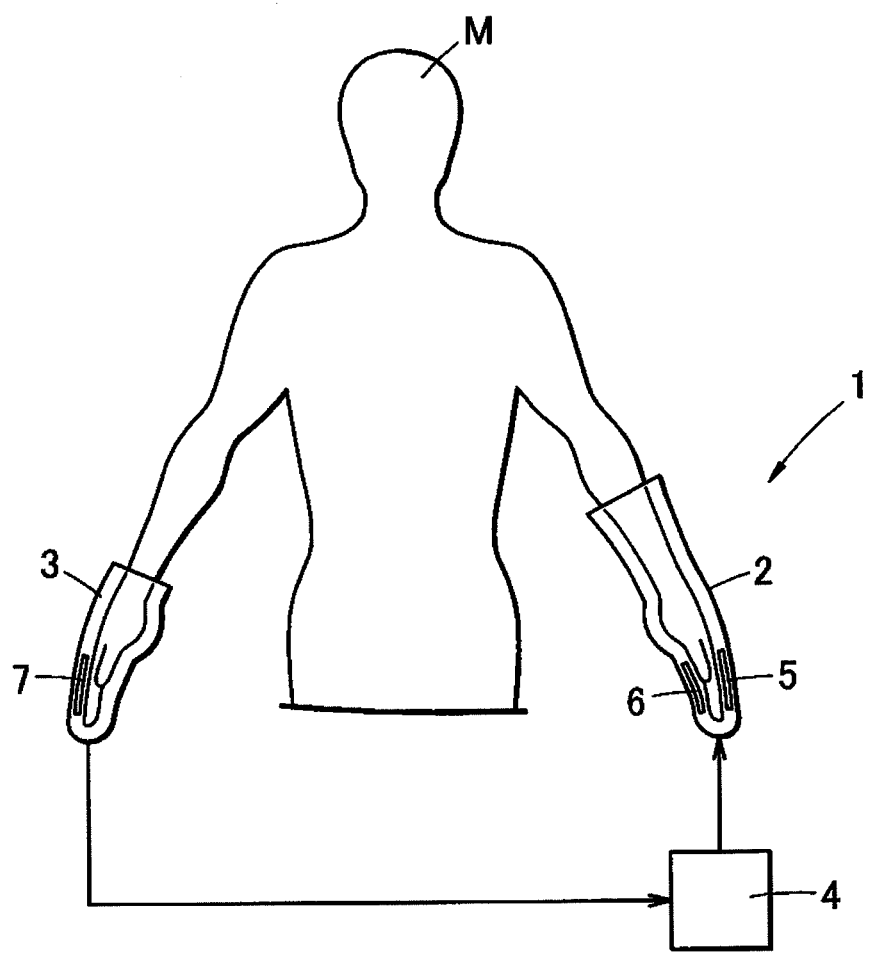
FIG. 1 is a view that shows a structure of a power assist glove in accordance with an embodiment of a motion assist apparatus of the present invention.

FIG. 1 is a view that shows a structure of a power assist glove in accordance with an embodiment of the motion assist apparatus of the present invention. As shown in FIG. 1, a power assist glove 1 is provided with a sensor unit 3, an actuator unit 2, and a control unit 4. The sensor unit 3 and the actuator unit 2 are respectively attached to two hands of a user M. In the present embodiment, the actuator unit 2 is attached to a left hand of the user, and the sensor unit 3 is attached to a right hand of the user; however, these may be respectively attached to the opposite hands reversely.

With this structure, the power assist glove 1 allows the control unit 4 to detect movements of fingers to which the glove is attached by a sensor 7 attached to the sensor unit 3 so that the other corresponding fingers are moved by actuators 5, 6 of the actuator unit 2 so as to assist their motions.

The actuators of the actuator unit 2 include the back-side actuator 5 attached to the back side (so-called back of the hand) and the palm-side actuator 6 attached to the palm side (so-called palm of the hand), and as will be described later, pressing forces are applied thereto in such directions as to cancel their pressing forces.

With this arrangement, it is possible to allow such a user having a paralyzed right or left half body to execute rehabilitation exercises effectively by using the power assist glove 1. For example, in the case where a left arm of the user is paralyzed, the sensor unit 3 is attached to an arm (right arm) on a normal side that is not paralyzed, and the actuator unit 2 is attached to the arm (left arm) that is paralyzed.

With this arrangement, by allowing the user to move the fingers on the normal side of his or her own, the control unit 4 can detect movements of the fingers on the normal side of his or her own through the sensor 3, and based upon the movements, the actuator unit 2 can assist the motions of the muscles of the corresponding fingers on the paralyzed side. Specifically, the user tries to move the fingers of both of the hands in the same manner, while looking at the fingers on the normal side, by using the power assist glove 1, so that the user is allowed to move his or her arm on the paralyzed side by himself or herself with a strong will and an image for recovery, thereby executing rehabilitation exercises; thus, it is possible to provide rehabilitation exercises for reconstructing a paralyzed neuron network. Such rehabilitation exercises can be carried out by the user himself or herself for a comparatively long period of rehabilitation time, without a necessity of assist from an occupational therapist or the like; therefore, it becomes possible to shorten time required for recovery, and also provide a greatly effective system for those who have paralysis on one side of the body, and these facts are described, for example, in Document 1 ("Rain of maracas is falling in the brain", written by Shinichiro Kurimoto, published by Kobunsha Co., ltd., Jun. 26, 2000, on sale) and Document 2 ("One example of Cerebral apoplectic hemiplegia in which superior limb functions are recovered by constrained-induced movement therapy", Jpn J Rehabil Med, Vol. 40, No. 12, 2003).

FIG. 2 is an appearance view that shows a structure of the sensor unit of the power assist glove shown in FIG. 1, in which the glove is attached to the right hand.

The sensor unit 3 is provided with a sensor-side attaching unit 31 that is a glove-shaped member to be attached to fingers on the normal side as described above. The glove-shaped sensor-side attaching unit 31 is constituted by finger portions 32 formed for five fingers independently and a middle hand portion 33 corresponding to a so-called main portion of the hand from which the finger portions 32 are excluded.

To each of the finger portions 32, a long-plate-shaped bending sensor 34 is attached in an extending direction of each of the finger portions 32 on the back side, that is, the so-called back side of the hand. The bending sensor 34 serves as the sensor 7 by which, when its shape is bent by an external force, a degree of the bent is detected. The bending sensors 34, placed on the back side of the hand of the respective finger portions 32, are allowed to bridge over portions corresponding to all the joints (IP joint (DIP joint, PIP joint), and MP joint) of each finger portion 32, and secured to a sensor-side attaching unit 31 by a sensor cover 35. Therefore, when the user to which the sensor unit 3 is attached executes bending and extending movements of the fingers, the finger portions 32 and the middle hand portion 33 of the sensor-side attaching unit 31 are deformed in response to the movements of the fingers so that the bending sensor 34 attached to the sensor attaching unit 31 is bent correspondingly. An output signal from the bending sensor 34 is outputted through a cable 36, and transmitted to the control unit 4.

Figure 3A:
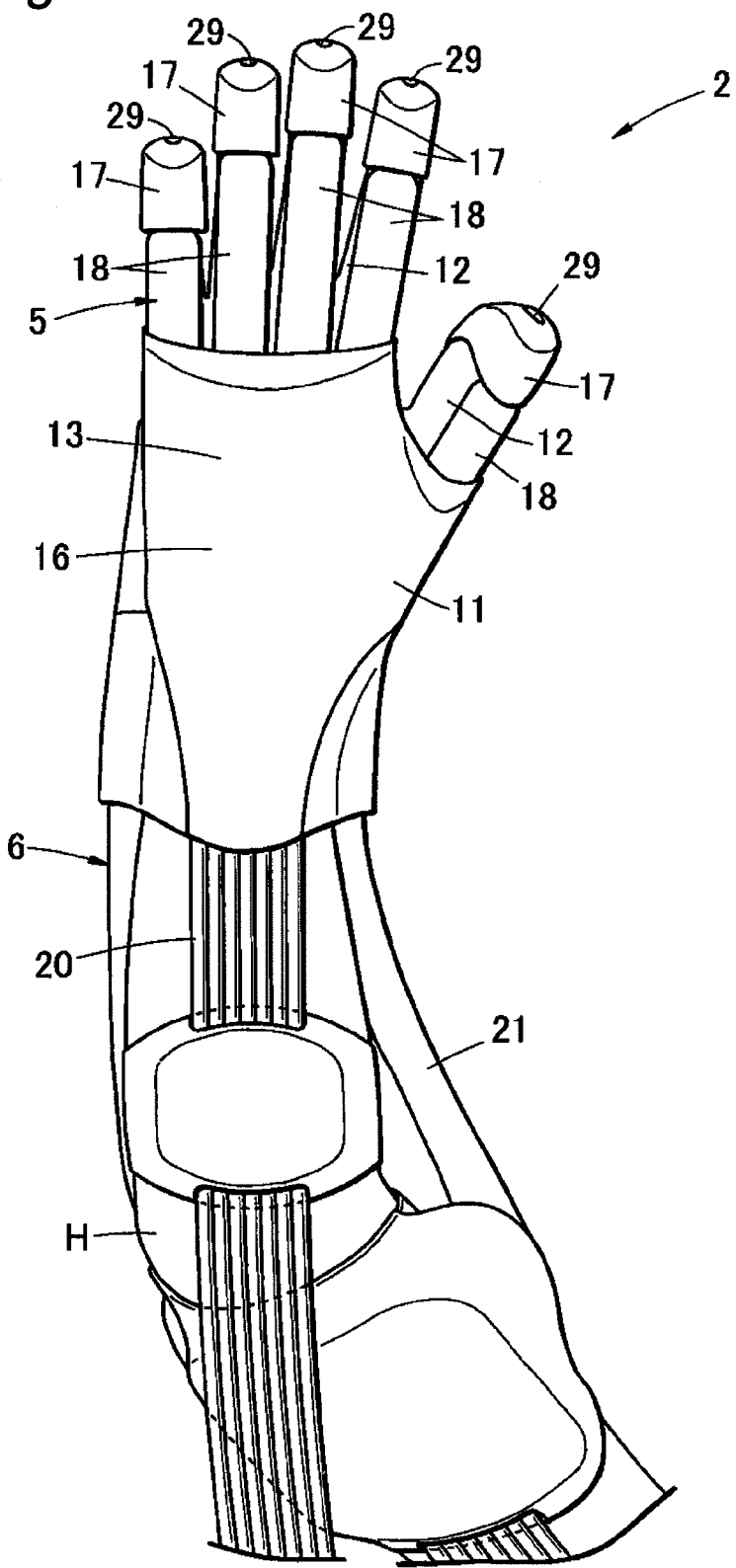
FIG. 3A is a structural view that shows an actuator unit of the power assist glove of FIG. 1, with finger portions being extended, when viewed from a back side of the hand.
Figure 3B:
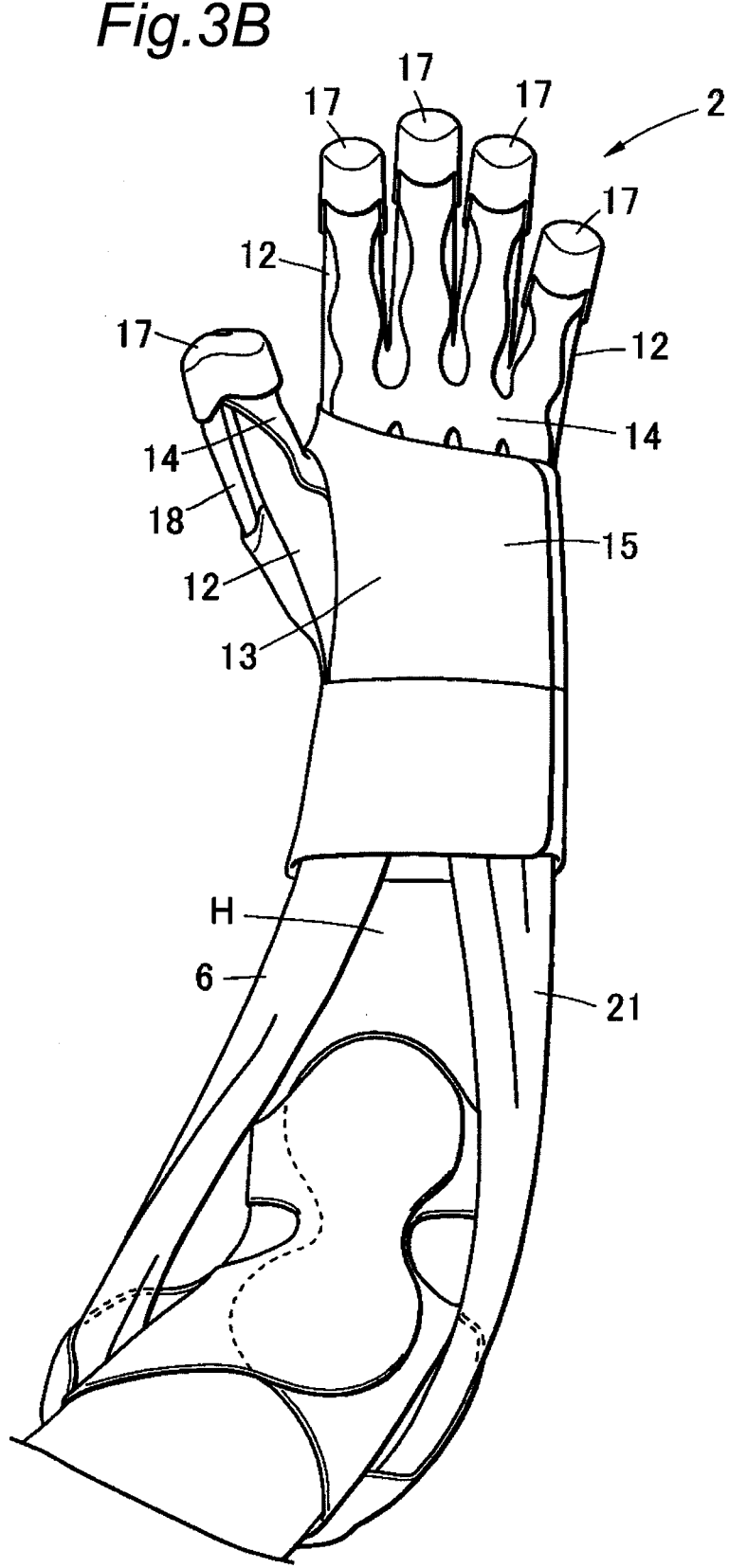
FIG. 3B is a structural view that shows the actuator unit of FIG. 3A, when viewed from a palm side of the hand.

FIGS. 3A to 3C are views that show the structure of the actuator unit 2 of the power assist glove shown in FIG. 1, which corresponds to a state in which the finger portions are extended, and FIG. 3A, is a view as seen from the back side, FIG. 3B is a view as seen from the palm side, and FIG. 3C is a view as seen from the side.

Figure 4A:
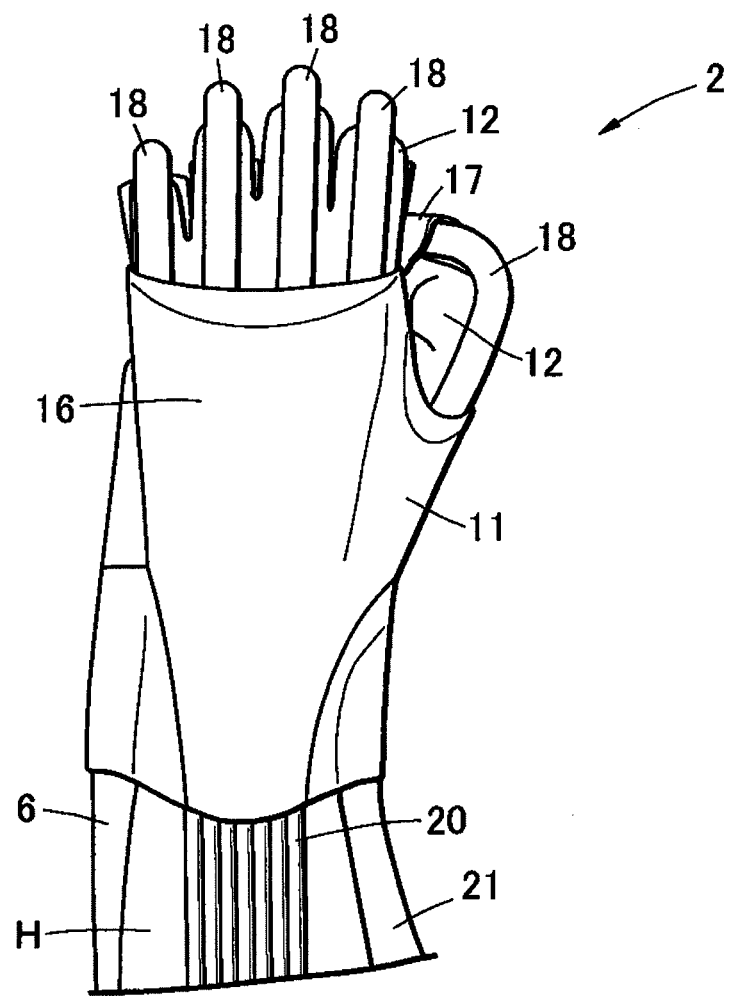
FIG. 4A is a structural view that shows an actuator unit of the power assist glove of FIG. 1, with finger portions being bent, when viewed from the back side of the hand.

FIGS. 4A and 4B are views that show the structure of the actuator unit 2, which corresponds to a state in which all finger portions 12 of an attaching unit 11 are bent, and FIG. 4A is a view as seen from the back side, and FIG. 4B is a view as seen from the palm side.

As shown in FIGS. 3A to 3C, the actuator unit 2 is a glove-shaped member to be attached to fingers H on the paralyzed side, as described above. The actuator unit 2 is provided with the glove-shaped actuator-side attaching unit 11 (hereinafter, when simply described as an attaching unit, this means the actuator-side attaching unit 11), the back-side actuator 5 placed on the back side of the actuator-side attaching unit 11, and the palm-side actuator 6 placed on the palm side of the actuator-side attaching unit 11.

The actuator-side attaching unit 11 is formed of the finger portions 12 that house the fingers of the user and are prepared independently for the five fingers, a middle hand portion 13 that houses the so-called main body portion of the hand from which the finger portions 12 are excluded, and covering members 14, 15, 16 and 17 that cover and conceal one portion or the entire portions of the back-side actuator 5 and the palm-side actuator 6, which will be described later.

Each of the back-side actuator 5 and the palm-side actuator 6 is provided with pneumatic rubber artificial muscles 18 and 19 the numbers of which are five respectively, and which respectively correspond to the finger portions 12. These rubber artificial muscles are installed as paired muscles on each of the finger portions 12, and serve as members for applying movements in both of bending and extending directions to the finger portions 12. The rubber artificial muscle 18 and the rubber artificial muscle 19 are disposed in such positions as to mutually cancel their generated forces (hereinafter, these positions are referred to as "cancelling positions").

Figure 6:
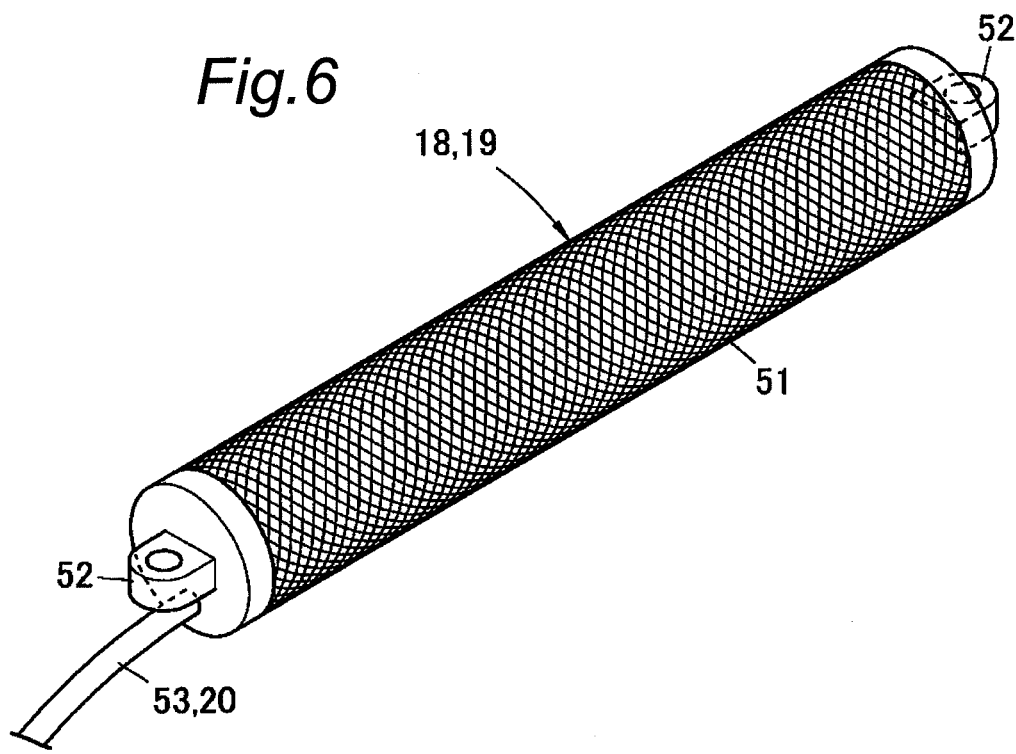
FIG. 6 is a view that shows an appearance structure of a pneumatic rubber artificial muscle to be used for the power assist glove of FIG. 1.

As the rubber artificial muscles 18 and 19, for example, a pneumatic actuator of Mckibben type having a cylinder unit with a pneumatic valve and a sleeve portion 51 as shown in FIG. 6, which is referred to also as a Mckibben pneumatic rubber artificial muscle, may be used. In the case where the Mckibben pneumatic actuator is used, the air valve, not shown, attached to an air tube 20, is released so that the cylinder unit is pressurized by compressed air from a high-pressure air source to be expanded, and a force is consequently exerted in such a direction as to shorten an overall length of the actuator, by a function of a sleeve portion 51 formed into a network structure. By adjusting the pressure of air to be filled into the cylinder, a degree of contraction of the actuator can be adjusted. In contrast, when the cylinder unit is pressure-reduced, the expansion of the cylinder unit is released, and the actuator is allowed to return to its original length. In this case, no force is exerted in the expanding direction of the actuator.

Connecting members 52 are attached to the two ends of each of the rubber artificial muscles 18 and 19 so as to transmit the motion of the expansion/contraction of the rubber artificial muscle to the outside. Predetermined portions of the actuator unit 2, which will be described later, are coupled to these connecting members 52 so that the actuator unit 2 is driven.

As described above, since the rubber artificial muscle 18 and the rubber artificial muscle 19 are placed at mutually cancelling positions, movements of fingers in both of extending and bending directions, achieved by using the pneumatic rubber artificial muscles, can be applied to each of the five independent finger portions 12. Moreover, in the rubber artificial muscle 18 and the rubber artificial muscle 19, a force is exerted only in such a direction as to shorten the original length; therefore, in the case where one of the rubber artificial muscles is shortened, the other rubber artificial muscle is pulled by the one of the rubber artificial muscles to be extended longer. Therefore, the other rubber artificial muscle is never expanded beyond its original length, and even when one of the rubber artificial muscles becomes extremely shorter, the deformation of the finger portion 12 can be suppressed within a predetermined range by the balanced lengths of the two rubber artificial muscles.

In the case where, for example, a motor or the like is used as the actuator to form a structure in which a single actuator applies pressing forces to the finger in both of the expanding/contracting directions, a problem tends to be raised in that a joint of a finger is driven into an impossible direction or by an excessive force beyond the original movement due to an incorrect operation of the motor or the like; however, the structure of the present embodiment prevents this problem from occurring.

The following description will explain attaching structures of the back-side actuator 5 and the palm-side actuator 6 onto the attaching unit 11. In this case, the back-side actuator 5, and the palm-side actuator 6 are respectively installed in association with the five independent finger portions 12, as described earlier. Therefore, with respect to the respective members forming the attaching unit 11, the back-side actuator 5 and the palm-side actuator 6, when the structures of the respective fingers are distinguished, branch numbers, such as "a" used for the thumb, "b_" for the index finger, "c_" for the middle finger, "d" for the fourth finger, and "e" for the little finger, are respectively attached to the reference numerals of the respective members.

Figure 5A:
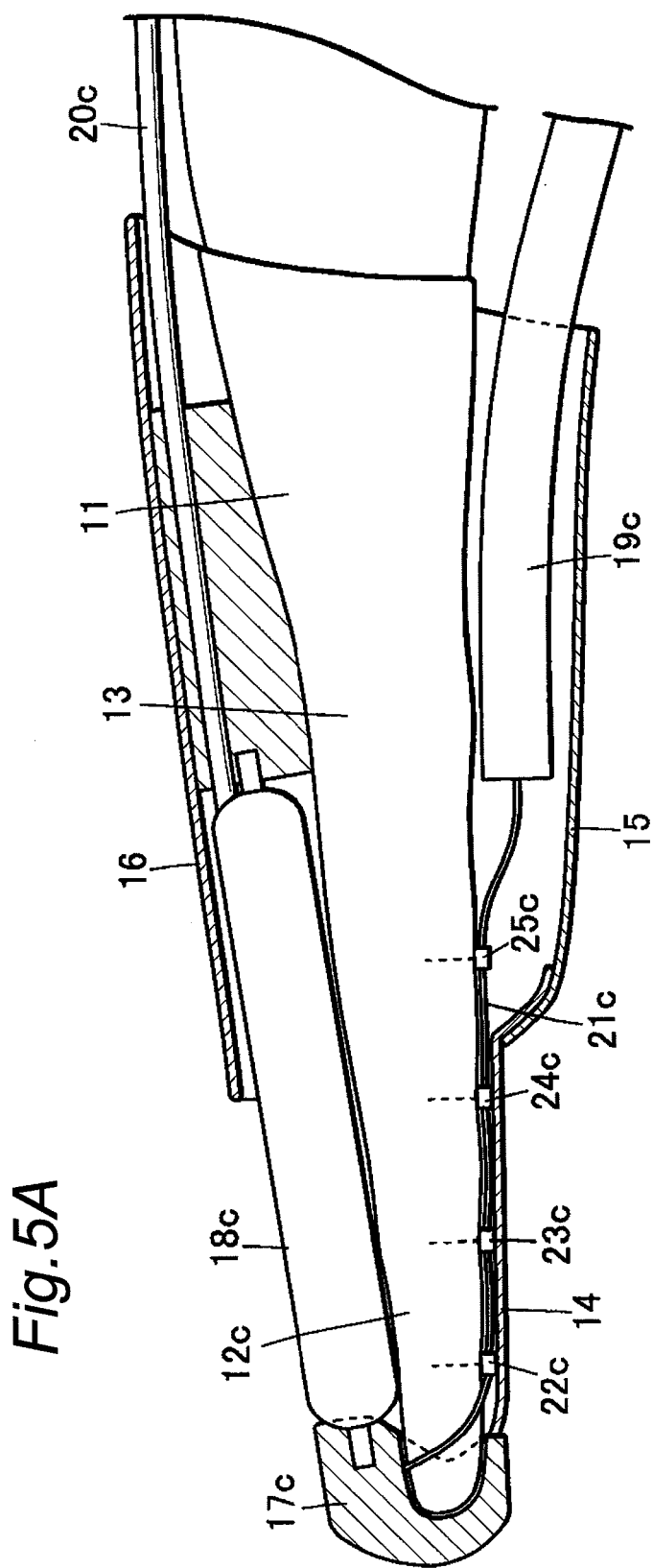
FIG. 5A is a view that shows a structure of an actuator in a middle finger portion of the actuator unit.
Figure 5B:
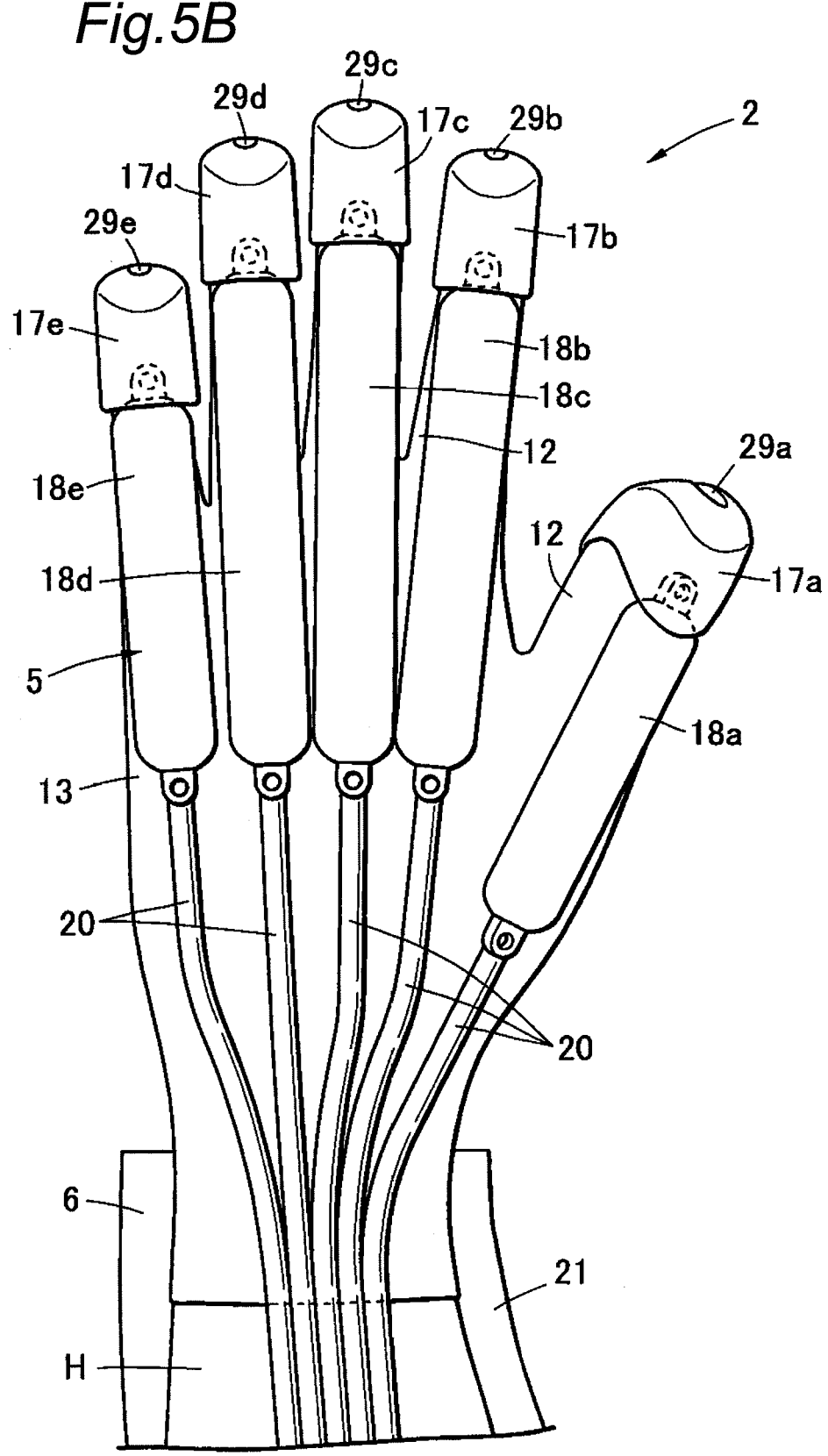
FIG. 5B is a view that shows an attached structure of a rubber artificial muscle of the back-side actuator.
Figure 5C:
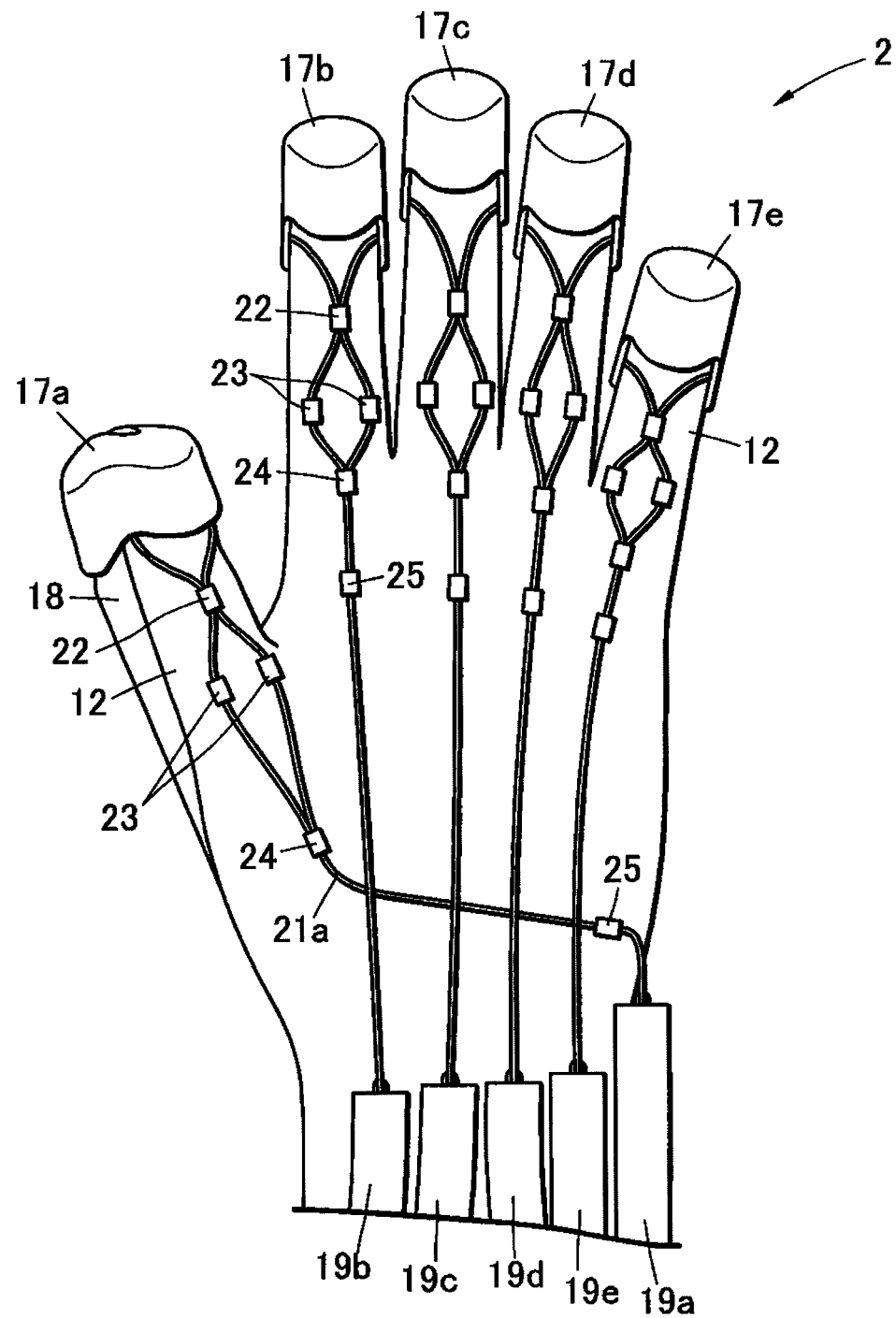
FIG. 5C is a view that shows an attached structure of a rubber artificial muscle of the palm-side actuator.
Figure 5D:
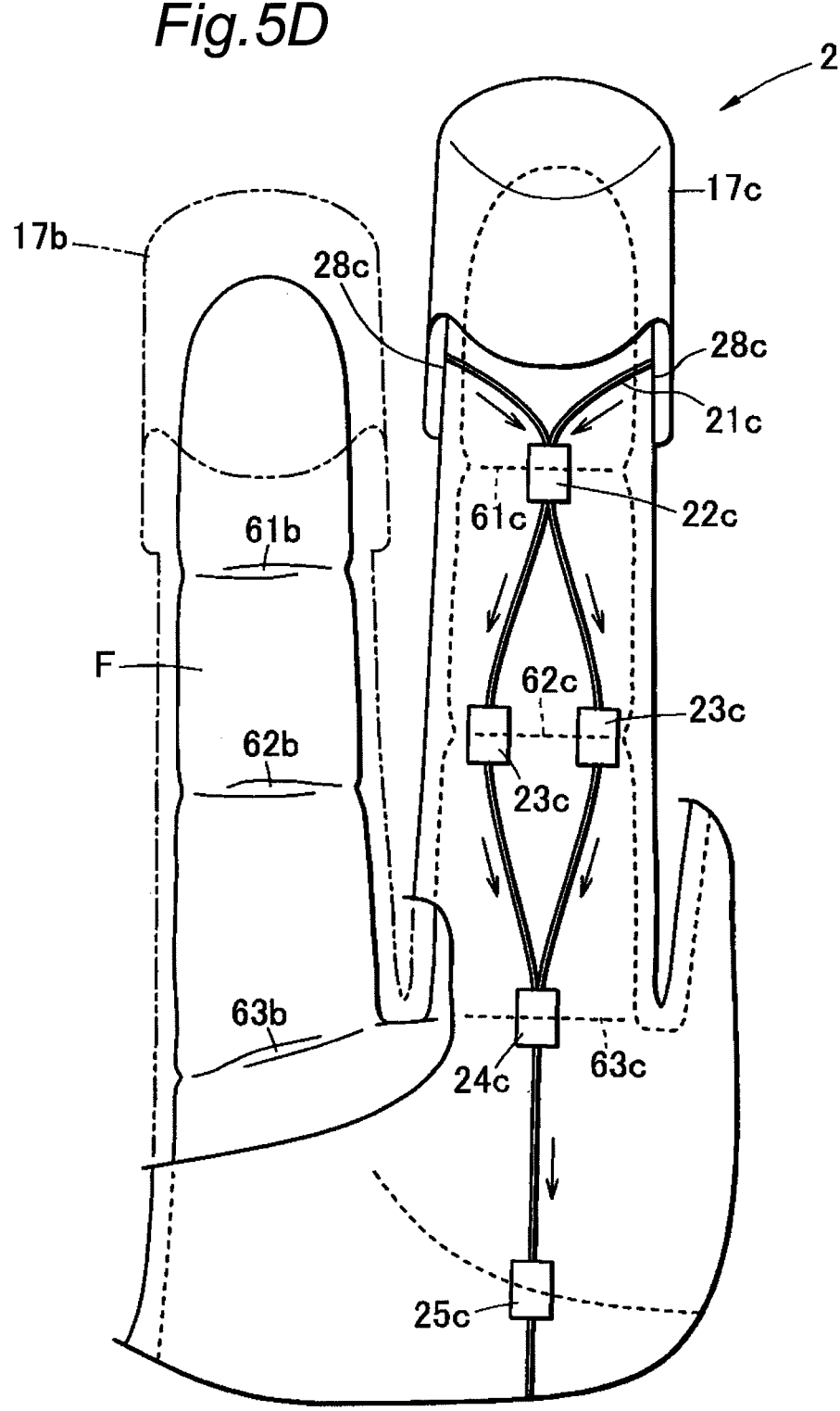
FIG. 5D is a view that shows an attached structure of a wire unit of the palm-side actuator in the middle finger portion.

FIG. 5A is a view that shows the structure of the actuator in the middle finger portion of the actuator unit, FIG. 5B is a view that shows the attaching structure of a rubber artificial muscle to the back-side actuator, FIG. 5C is a view that shows the attaching structure of a rubber artificial muscle to the palm-side actuator, and FIG. 5D is a view that shows the attaching structure of a wire unit in the middle finger portion of the palm-side actuator.

First, the attaching structure of the back-side actuator 5 will be explained. As shown in FIGS. 5A and 5B, a rubber artificial muscle 18 forming the back-side actuator 5 is attached to the surface of the attaching unit 11 on the back side in a manner so as to bridge between a tip covering member 17 and the middle hand portion 13 of the finger portion 12 of the attaching unit 11.

The tip covering member 17 is a cap-shaped member, made of a resin or the like, that is formed so as to cover the tip of the finger portion 12 of the attaching unit 11. The tip covering member 17 is formed, with a thickness on the back side being made larger with respect to the finger portion 12 of the attaching unit 11, and is designed to be secured by inserting a rubber artificial muscle 18 thereto. A light emitting unit 29 made of an LED is attached to each tip portion of the tip covering members 17. The light-emitting unit 29 is allowed to emit light by an operation signal from the control unit 4, as will be described later.

A rubber artificial muscle 18 used for the back-side actuator 5 is attached along each of the finger portions 12. The rubber artificial muscle 18 has its one end secured to the inner side of the tip covering member 17, with the other end secured to the surface of the middle hand portion 13 on the back side, so that its middle portion is not secured to the attaching unit 11. The natural length (in a state where an inside pressure of the cylinder unit corresponds to the atmospheric pressure) of each of the rubber artificial muscles 18 is preferably designed to such a length as to be placed along a surface of the finger portion on the back side, when the finger portion 12 is bent to a maximum limit. Therefore, in an initial shape of the attaching unit 11, that is, in the shape of each finger that is slightly bent onto the palm side, which is a shape with no force being applied to the human hand, the rubber artificial muscle 18 of the back-side actuator 5 is disposed in a manner so as to allow its middle portion to float from the surface of the attaching unit 11 on the back side.

The rubber artificial muscle 18 of the back-side actuator 5 has its end portion located on the middle hand side covered with the covering member 16 on the back side. Therefore, the connecting unit 53 and the air tube 20 are not exposed to the outside.

In accordance with the back-side actuator 5 with the rubber artificial muscle 18 disposed as described above, by filling the cylinder unit of the rubber artificial muscle 18 with compressed air, the rubber artificial muscle 18 is contracted so that a motion assisting process can be carried out from the bent state of the finger to the extended state thereof.

The following description will discuss an attaching structure of the palm-side actuator 6. As shown in FIGS. 5A, 5C, and 5D, the palm-side actuator 6 is provided with a wire unit 21 placed along the middle hand portion 13 from the tip of the finger portion 12 of the attaching portion 11, and a rubber artificial muscle 19 connected to the wire unit 21, which are placed on the surface on the palm-back side of the attaching unit 11.

The wire unit 21 is formed of a wire formed by bending one wire in the middle portion into an annular shape. The two wires forming an end portions of the wire bent in the middle portion are wound onto the palm side of the finger portion 12 through the two side portions 28 on the tip of the finger portion from the surface of the back side of the finger portion 12. The wire unit 21 is guided by guide members 22, 23, and 24 placed positions corresponding the respective joints on the surface on the palm side of the finger portion 12 and a guide member 25 placed on the surface of the palm side of the middle hand portion 13. Moreover, the guide members 22, 23, and 24 to be formed on the finger portions 12 are disposed with repetitive wide and narrow portions, so as to provide different intervals among the respective positions corresponding to the joints. Additionally, the intervals of the guide members 25 of the middle hand portion 13 are not required to be disposed with such repetitive wide and narrow portions.

More specifically, each of the first guides 22 placed at a position corresponding to an IP joint (not shown) of a thumb finger portion 12*a* and DIP joints 61 of the other finger portions 12 is attached to one portion in a center position in a width direction of each finger portion 12, and allows the wire units 21 wound around thereto to pass therethrough. Moreover, the second guides 23 placed at a position corresponding to an MP joint (not shown) of the thumb finger portion 12*a* and PIP joints 62 of the other finger portions 12 are attached to finger portions with a gap in the width direction of the finger portion 12 in the center position in the width direction of each finger portion 12, with the two wires being allowed to pass therethrough. Furthermore, each of the third guides 24 placed at a position corresponding to a middle finger joint (not shown) of the thumb finger portion 12*a* and MP joints 63 of the other finger portions 12 is to one portion in the center position in the width direction of each finger portion 12, and allows the two wires wound around thereto to pass therethrough.

The guides 25, placed on the middle hand portion 13, are used for guiding the wires that have passed through the third guides 24 to each of the rubber artificial muscles 19, without making a difference in each gap therebetween.

By placing on the finger portions 12 the guides 22, 23, and 24 with the repetitive wide and narrow portions, the wires of the wire unit 21 are disposed in a triangular shape for each of spaces between the joints. Therefore, relative to the wire unit 21 pulled linearly due to the contraction of the rubber artificial muscles 19, as indicated by arrows in FIG. 5D, two portions sandwiching the joint of a finger F of the user can be pulled from the sides to the center, or from the center to the sides in the width direction, without causing a deviation, along the extending direction of the fingers, that is, in the extending direction of the wire unit 21, without causing a deviation. Therefore, without exerting a force in an impossible direction on the joint of the finger F that is easily damaged even by an application of a comparatively small external force, a proper force can be exerted in the original bending direction of each of the finger joints. Therefore, it is possible to prevent damages from occurring in each of the finger joints.

Additionally, with respect to the thumb finger portion 12*a*, as shown in FIG. 5C, the wire unit 21*a* is guided so as to be wound toward a little finger side on the middle hand portion 13. This is because the human thumb is formed not to be bent in the extending direction of the fingers on the MP joint 63, but to be bent in the direction toward the little finger; therefore, only the wire unit 21*a* of the thumb is disposed in such a manner that the natural motions of the human thumb joint can be realized.

The rubber artificial muscle 19 and the wire unit 21 used for the palm-side actuator 6 have their total natural length (in a state where the inner pressure of the cylinder unit corresponds to the atmospheric pressure) preferably set to a length that is properly placed along the surface of the finger portion 12 on the palm side, when the finger portion 12 is extended to the maximum limit. Therefore, in the initial shape of the attaching unit 11, that is, in the shape of each finger that is slightly bent onto the palm side, which is a shape with no force being applied to the human hand, the rubber artificial muscle 19 or the wire unit 21 of the back-side actuator 5 has a slight margin length.

The wire unit 21 of the palm-side actuator 6 is covered with each finger portion covering member 14 so that no contact is made with the wire unit 21 from the outside. Moreover, on the middle hand portion 13, the wire units 21 and the rubber artificial muscles 19 are covered with the palm-side covering members 15 so that the wire units 21, the rubber artificial muscles 19, and the air tubes 20 are not exposed to the outside.

In accordance with the palm-side actuator 6, with the wire units 21 and the rubber artificial muscles 19 being disposed as described above, by filling the cylinder unit of each of the rubber artificial muscles 19 with compressed air, the rubber artificial muscles 19 are contracted so that, by pulling the wire units 21 in the width direction without a deviation, a motion assisting process can be carried out from the extended state of the finger to the bent state thereof.

Figure 8:
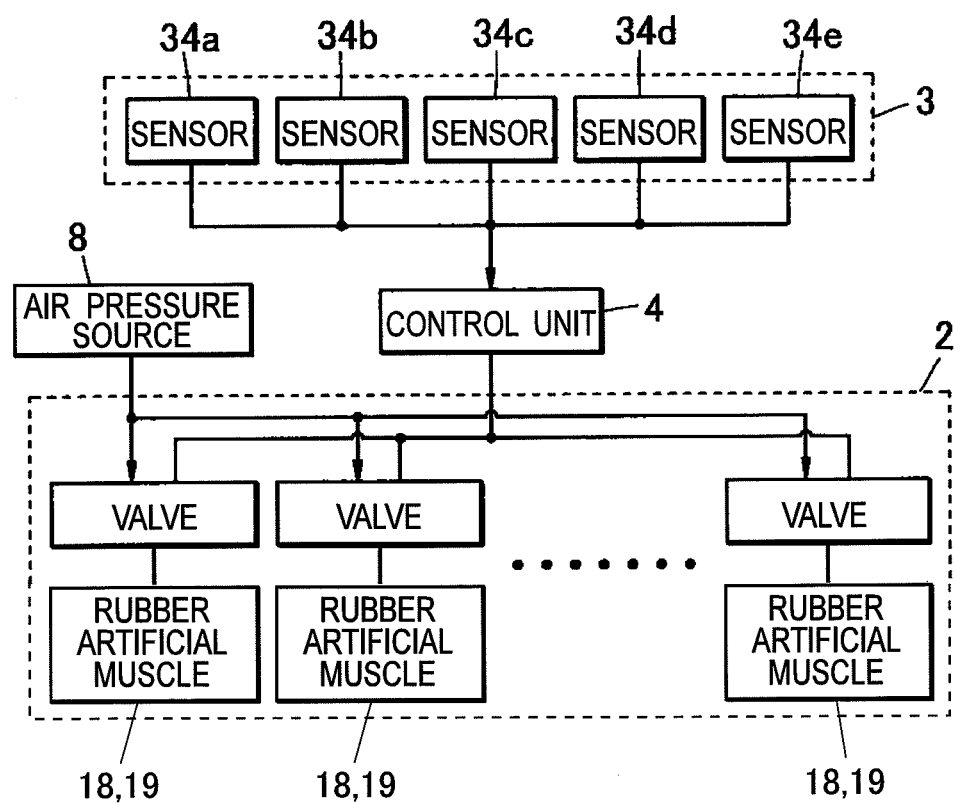
FIG. 8 is a functional block diagram of a power assist glove 1 in accordance with a first embodiment of the present invention.

The following description will discuss an operation controlling process of the power assist glove 1. FIG. 8 is a functional block diagram of the power assist glove 1 in accordance with a first embodiment of the present invention. As shown in FIG. 8, in the power assist glove 1, bending sensors 34 (34*a* to 34*e*) of the sensor unit 3 are respectively connected to the control unit 4. The control unit 4 detects respective outputs of the bending sensors 34, and determines what movement the user is trying to do. Moreover, based upon the result of the determination, the control unit 4 open/close controls the respective air valves corresponding to the rubber artificial muscles 18 and 19 connected to the air pressure source 8, and the air pressure is subsequently changed so that the rubber artificial muscles 18 and 19 of the actuator unit 2 are operated. Thus, the control unit 4 makes it possible to exert a motion assisting process on a desired portion of the user, in a desired direction with a desired force.

Figure 7:
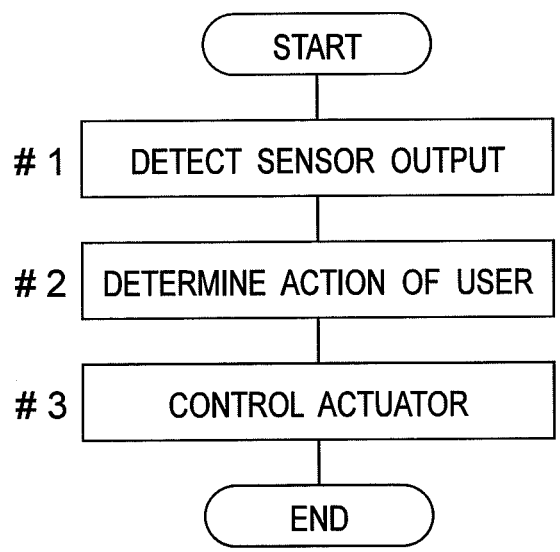
FIG. 7 is a flow chart that shows operation steps upon carrying out a motion assist for the user by using the power assist glove.

The following description will discuss the motion assisting method for the user by the power assist glove 1 in more detail. FIG. 7 is a flow chart that shows operation steps used upon carrying out the motion assisting process on the user by the power assist glove 1.

First, as shown in FIG. 6, the control unit 4 of the power assist glove 1 starts detecting an output from the bending sensors 34 (#1).

Upon detection of an output from the bending sensors 34 by the control unit 4, the control unit 4 determines which finger the user is trying to move in which direction based upon the output (#2). The bending sensor 34 can detect its shape change in three levels, that is, in an extending state, an intermediate state, and a bending state, and outputs an output signal in accordance with each of the shapes. By detecting which bending sensor 34 outputs what shape of an output signal, the control unit 4 can determine which finger the user is trying to move in which direction.

Next, the control unit 4 open/close controls the air valves of the rubber artificial muscles 18 and 19 attached to the finger unit 12 corresponding to the bending sensor 34 that has detected the shape, as described earlier, so that the rubber artificial muscles 18 and 19 are allowed to carry out desired operations (#3). Moreover, the sequence returns to step #1 so that the control unit 4 again starts detecting an output from the bending sensors 34.

For example, in step #2, in the case where the control unit 4 detects the output of the bending sensors 34, and determines that the user is trying to "bend finger joints", the control unit 4 controls the air valves of the rubber artificial muscle 18 on the back side and the rubber artificial muscle 19 on the palm side so that the pressures of the insides of the respective cylinders are adjusted. With this process, the control unit 4 applies a pressing force in the extending direction by contracting the rubber artificial muscle 19 on the palm side, while it releases the pressing force of the rubber artificial muscle 18 on the back side, so that a force for assisting the user to bend the finger joints can be applied.

In this case, it is not necessarily required for the control unit 4 to start the pressure controlling processes of the rubber artificial muscles 18 and 19 simultaneously with the timing (time T1) at which the force detected by the sensors 34 exceeds a predetermined threshold value. It is better in some cases to cause a slight delay in the timing at which the pressure control for the rubber artificial muscles 18 and 19 is started because this delay sometimes brings good results in rehabilitation of the user; therefore, this amount of delay is preferably made to be adjustable. For example, an adjusting unit, such as a switch or a dial, for adjusting this amount of delay is installed in the control unit 4, and by allowing the user to operate the adjusting unit, it becomes possible to assist motions in a state where more effects are given to rehabilitation of the user.

Additionally, the bending level (the greater the value, the greater the degree of bending) of each of the bending sensors 34, and the pressure level set to each of the rubber artificial muscles 18 of the back-side actuator 5 and the rubber artificial muscles 19 of the palm-side actuator 6, are shown in the following Table 1. In this table, the pressure level becomes higher, as the figure becomes greater, and the pressure level 1 represents a state in which the valve is opened so that the pressure inside the cylinder is substantially the same as the atmospheric pressure.

TABLE 1

| SENSOR BENDING LEVEL | PRESSURE LEVEL OF ACTUATOR ON BACK SIDE | PRESSURE LEVEL OF ACTUATOR ON PALM SIDE | SHAPE OF FINGER PORTION |
| --- | --- | --- | --- |
| POWER SUPPLY OFF | 1 | 1 | INITIAL SHAPE (NO PRESSING FORCE) |
| 1 | 3 | 1 | EXTENDED SHAPE |
| 2 | 2 | 2 | INTERMEDIATE SHAPE |
| 3 | 1 | 3 | BENT SHAPE |

Figure 9:
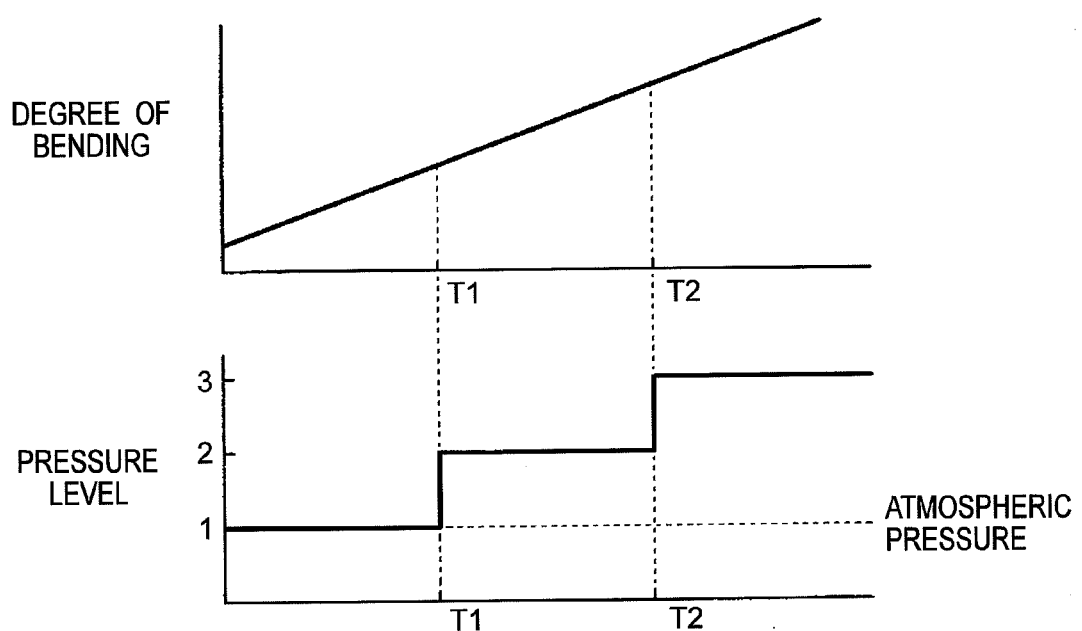
FIG. 9 is a diagram that explains functions of a control unit of the power assist glove 1 of the first embodiment of the present invention.

FIG. 9 is a diagram that explains functions of the control unit 4 of the power assist glove 1 in accordance with the first embodiment of the present invention. In FIG. 9, for example, the upper portion shows a graph relating to movements of the fingers of the user upon moving the fingers from an extended state to a bent state, and the lower portion shows a graph relating to the size of a bending level detected by the bending sensors 34 at that time. The time 't' is plotted on an axis of abscissas.

For example, in response to the bending of each finger, the deformation of each of the bending sensors 34 is started. At time T1, each of the bending sensors 34 is changed from a bending level 1 to a bending level 2, with a predetermined threshold value being exceeded, the corresponding output signal is transmitted. Upon detection of the output signal, the control unit 4 controls the air valves so that the pressures of the respective cylinder units of the rubber artificial muscle 18 and the rubber artificial muscle 19 are set to predetermined values. With this arrangement, a pressing force P2 in the contracting direction can be applied to a specific finger of the user. Additionally, upon detection of the fact that a specific finger is bent, the control unit 4 may carry out a control process so as to emit light from an LED of the light-emitting unit 29 of the actuator unit 2 corresponding to the specific finger.

In other words, in a power-OFF state of the power assist glove, both of the pressure levels of the back-side actuators 5 and the palm-side actuators 6 on are "1", with no pressing force of the actuators 5 and 6 being applied to the actuator unit 2. For this reason, it is possible to easily attach the actuator unit 2. Moreover, when the user puts on the actuator unit 2 and the sensor unit 3, and turns the power supply on, compressed air is sent to the back-side actuator 5 and the palm-side actuator 6 in accordance with sensor bending levels thereof so that pressing forces are exerted by the actuators 5 and 6. In the case of the sensor bending level of '1', the fingers are kept in a substantially extended state (initial state), and at this time, the pressure level of the back-side actuator 5 is set to '3', while the pressure level of the palm-side actuator 6 is set to '1' (no pressing force is exerted). That is, the finger portions 12 are pulled in the extending direction by the back-side actuator 5, with the amount of extension of the finger portions 12 being regulated by the palm-side actuator 6.

Moreover, as the sensor bending level becomes greater, the pressure of the back side actuator 5 is reduced, with the pressure of the palm-side actuator 6 becoming greater. Accordingly, the palm-side actuator 6 becomes shorter, and the finger portions 12 are consequently pulled by the wire unit 21 so that a pressing force is exerted in the bending direction, with the amount of bending of the finger portions 12 being regulated by the back-side actuator 5.

In this manner, in the power assist glove 1, by simultaneously contracting and releasing the rubber artificial muscles 18 on the back side and the rubber artificial muscles 19 on the palm side, the motions of the finger joints of the user can be carried out more smoothly. Moreover, since the rubber artificial muscles 18 on the back side and the rubber artificial muscles 19 on the palm side are allowed to exert a pressing force only in the contracting direction, and since the rubber artificial muscles on the opposing side are allowed to function to prevent excessive deformations of the rubber artificial muscles, the finger joints are prevented from being driven in an impossible direction with an excessive force, relative to the original movements. For example, in the case of extending fingers, the rubber artificial muscles 18 on the back side contract to exert pressing forces in the extending direction of the fingers, while the rubber artificial muscles 19 on the palm side are not extended beyond a predetermined length; therefore, it is possible to prevent the fingers from being excessively extended by the contraction of the rubber artificial muscles 18 on the back side.

As described above, by allowing the user to move his or her fingers on the normal side to which the sensor units 3 have been attached, the control unit 4 detects movements of his or her fingers on the normal side through the sensor units 3, and controls the actuator unit 2 based upon the movements. With this arrangement, it is possible to assist the movements of muscles corresponding to the fingers on the paralyzed side. That is, by using the power assist glove 1, the user tries to move his or her fingers on both of the hands in the same manner, while watching the fingers on the normal side, so that the user moves his or her arm on the paralyzed side by himself or herself with a strong will and an image for recovery, thereby executing rehabilitation exercises.

In addition to the aforementioned structure in which the timing of the light emission of the light emitting unit 29 is made coincident with the detection of bending by the bending sensors 34, the light emission may be given in another timing. For example, a light emitting unit 29, attached to a finger to be subjected to operations for rehabilitation of motions, may be made to emit light so that the rehabilitation of the corresponding finger may be carried out in synchronism with the light emission.

Moreover, since the power assist glove 1 uses the flexible pneumatic rubber artificial muscles 18 and 19 as the actuator, another effect is that the user hardly feels pains.

The present invention is not intended to be limited by the above-mentioned embodiments, and may be applied to various other modes.

For example, the attaching unit 11 of each of the actuator unit 2 and the sensor unit 3 is provided with five fingers independently; however, it is not necessarily required to provide the five independent fingers, and, for example, a structure with the thumb and the other fingers divided therefrom, such as a mitten, may be used.

The power assist glove 1 has been exemplified as the structure in which the sensor unit 3 is attached to the arm on the normal side, with the actuator unit 2 being attached to the arm on the paralyzed side; however, the present invention is not intended to be limited by this structure. For example, in addition to the above-mentioned structure, another sensor may also be attached to the arm on the paralyzed side, and by allowing the control unit 4 to detect the movements of the muscles of the arm on the paralyzed side, the degree of recovery of the muscles of the user can be measured.

Moreover, at this time, the control unit 4 measures the degree of recovery of muscles of the user, and in accordance with the results thereof, the assist amount of motions is varied (for example, as the muscles are recovered, the assist amount is reduced) so that rehabilitation exercises can be carried out more effectively.

Moreover, another structure may be proposed in which the user is allowed to hold a gripping gear or the like by the arm on the side to which the sensor unit 3 is attached, with a pressure sensor or the like being attached thereto, so that the grip of the user is detected, and based upon the change in the grip, a safety switch can be activated. For example, in the case where the grip is lowered, the safety switch may be activated to turn the device off. In this case, a superior structure in safety can be realized, and since the arm with a sufficient force exerted thereon allows a sensing process of the shapes of fingers to be more easily carried out, rehabilitation exercises can be carried out more effectively.

Furthermore, in the above-mentioned embodiments, each of the bending sensors 34 is designed to detect bending levels in three stages; however, the present invention is not intended to be limited by this structure, and a multi-stage or non-stage detection process may be carried out. In addition, the number of adjusting stages of the pressure levels of the rubber artificial muscles 18 on the back side and the rubber artificial muscles 19 on the palm side is preferably increased in accordance with the number of the detection levels of the bending sensors 34.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2007-289813 filed on Nov. 7, 2007, including specification, claims, drawings, and summary are incorporated herein by reference in its entirety.

The invention claimed is:

1. A motion assist apparatus comprising:
   an attaching member that has a glove shape with finger portions and a middle hand portion that is attachable to one of hands of a user;
   a back-side actuator that is freely expanded and contracted, and bridged between a tip of each of the finger portions and the middle hand portion on the back side of the attaching member; and
   a palm-side actuator that is freely expanded and contracted, and bridged between the tip of each of the finger portions and the middle hand portion on the palm side of the attaching member,
   wherein the palm-side actuator is provided with a wire unit formed of two wires and a rubber artificial muscle,
   the two wires are disposed on each of the finger portions on the palm side from the tip of each of the finger portions on the back side to the middle hand portion along the finger portion, passing through two side portions of the finger portion, so that intervals therebetween are made different at respective positions corresponding to joints of the finger portion, and
   the rubber artificial muscle is coupled to the wire unit and is formed on the middle hand portion.

2. The motion assist apparatus according to claim 1, wherein the wire unit is designed so that the wires have repetitive wide and narrow intervals, so as to provide such intervals as to be narrowed at the positions corresponding to the tip joint of each of the finger portion, and widened at positions corresponding to other joint.

3. The motion assist apparatus according to claim 1, wherein the finger portions of the attaching member are formed so as to have independent five fingers, with the back-side actuator and the palm-side actuator being disposed in association with each of the finger portions.

4. The motion assist apparatus according to claim 2, wherein the finger portions of the attaching member are formed so as to have independent five fingers, with the back-side actuator and the palm-side actuator being disposed in association with each of the finger portions.

5. The motion assist apparatus according to claim 1, further comprising:
   a sensor unit that is provided with a bending sensor that is disposed along each of fingers of the other hand of the user with the apparatus being attached thereto, and detects a bending state of the corresponding finger; and
   a control unit for carrying out an operation controlling process on the back-side actuator and the palm-side actuator based upon the bending/ extending state of the finger detected by the sensor unit.

6. The motion assist apparatus according to claim 5, wherein the control unit carries out an operation controlling process so that the back-side actuator and the palm-side actuator are allowed to execute same extending and bending motions that have been detected by the sensor unit.

7. The motion assist apparatus according to claim 5, further comprising:
   an air pressure source for supplying air to the back-side actuator and the palm-side actuator;
   wherein each of the back-side actuator and the palm-side actuator includes a pneumatic rubber artificial muscle, and
   the control unit operates the back-side actuator and the palm-side actuator by controlling an air pressure of the pneumatic rubber artificial muscle.

8. The motion assist apparatus according to claim 6, further comprising:
   an air pressure source for supplying air to the back-side actuator and the palm-side actuator;
   wherein each of the back-side actuator and the palm-side actuator includes a pneumatic rubber artificial muscle, and
   the control unit operates the back-side actuator side and the palm-side actuator by controlling an air pressure of the pneumatic rubber artificial muscle.

9. The motion assist apparatus according to claim 5, further comprising:
   a light emitting device at the tip of each of the finger portions,
   wherein the control unit allows the light emitting device to emit light in cooperation with detection by the sensor unit.

10. The motion assist apparatus according to claim 6, further comprising:
    a light emitting device at the tip of each of the finger portions,
    wherein the control unit allows the light emitting device to emit light in cooperation with detection by the sensor unit.

11. The motion assist apparatus according to claim 7, further comprising:
    a light emitting device at the tip of each of the finger portions,
    wherein the control unit allows the light emitting device to emit light in cooperation with detection by the sensor unit.

12. The motion assist apparatus according to claim 8, further comprising:
    a light emitting device at the tip of each of the finger portions,
    wherein the control unit allows the light emitting device to emit light in cooperation with detection by the sensor unit.

* * * * *